United States Patent
Lee et al.

(10) Patent No.: US 7,136,562 B2
(45) Date of Patent: Nov. 14, 2006

(54) LIGHT GUIDE PLATE WITH A REFLECTIVE MEANS AND PROCESS FOR FORMING THE SAME

(75) Inventors: Chun-Yu Lee, Tu-Chen (TW); Ming-Chiang Tsai, Tu-Chen (TW); Tsung-Wei Chiang, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 149 days.

(21) Appl. No.: 10/925,288

(22) Filed: Aug. 23, 2004

(65) Prior Publication Data
US 2005/0041413 A1    Feb. 24, 2005

(30) Foreign Application Priority Data
Aug. 22, 2003   (TW) ............................... 92123137 A

(51) Int. Cl.
G02B 6/10   (2006.01)
B05D 5/06   (2006.01)

(52) U.S. Cl. ................. 385/129; 385/141; 385/133; 427/163.1; 427/163.4; 427/164; 427/169

(58) Field of Classification Search ................ 385/123, 385/126, 127, 128, 141, 129, 133; 427/163.1, 427/163.2, 163.4, 164, 165, 169
See application file for complete search history.

(56) References Cited

U.S. PATENT DOCUMENTS

| | | | |
|---|---|---|---|
| 5,509,095 A * | 4/1996 | Baker et al. | 385/31 |
| 6,273,577 B1 | 8/2001 | Goto et al. | 362/31 |
| 6,572,743 B1 * | 6/2003 | Miller et al. | 204/297.06 |
| 6,595,651 B1 | 7/2003 | Jeong et al. | 362/31 |
| 6,882,762 B1 * | 4/2005 | Brist et al. | 385/14 |
| 2004/0252958 A1 * | 12/2004 | Abu-Ageel | 385/133 |
| 2005/0244126 A1 * | 11/2005 | Howard et al. | 385/133 |

* cited by examiner

Primary Examiner—Brian M. Healy
(74) Attorney, Agent, or Firm—Wei Te Chung

(57) ABSTRACT

A process for forming a light guide plate with a reflection film includes: (a) providing a light guide plate (30), which has a light input surface (303) with light incident portions (3032), a bottom surface (304), a light output surface (301), and side surfaces (302); (b) attaching protection film (32) on the light incident portions and the light output surface; (c) providing a reflection solution; (d) dipping the light guide plate in the reflection solution; (e) removing the light guide plate from the reflection solution, and solidifying a portion of the reflection solution remaining on the light guide plate to thereby form a reflection film; and (f) removing the protection film to expose the light incident portions and the light output surface. Because the reflection film is directly attached to the light guide plate, there is no gap and no attendant leakage of light.

9 Claims, 2 Drawing Sheets

LIGHT GUIDE PLATE WITH A REFLECTIVE MEANS AND PROCESS FOR FORMING THE SAME

BACKGROUND OF THE INVENTION

1. Field of the Invention

The present invention relates to a light guide plate typically used in a liquid crystal display (LCD), and particularly to a light guide plate with a reflective means and a process for making the same.

2. Description of the Prior Art

A light guide plate is one of the key optical members used in a plane light source of an LCD. Usually, the function of the light guide plate is to receive light beams from certain light sources or the ambient environment, and to emit the received light beams uniformly in a certain direction. The light guide plate functions as a kind of light channel, and should collect light beams efficiently, minimize any propagation loss of the light beams, and emit the light beams uniformly.

Accordingly, a typical light guide plate includes a light receiving portion for collecting light beams and a light emitting portion for emitting the light beams. The body of the light guide plate is made of a highly light transmissive material. Other portions or surfaces of the light guide plate do not need to receive light or emit light, and internal or external reflective means must be used thereat to prevent light beams from improperly entering or emitting from the light guide plate.

Referring to FIG. 3, a conventional plane light source comprises a light guide plate 10 and a pair of light sources 11 adjacent to the light guide plate 10. The light guide plate 10 has a light incidence surface 103, a bottom surface 104, a light emitting surface 101 opposite to the bottom surface 104, and three non-incident side surfaces 102. The light incidence surface 103 has a pair of light incident portions 1031 corresponding to the light sources 11, and a non-incident portion 1032.

Referring also to FIG. 4, three reflection means are used in the plane light source. A reflection plate 106 is disposed under the bottom surface 104, a reflection member 105 is disposed to cover the non-incident portion 1032, and a reflection frame 21 is disposed around the non-incident side surfaces 102.

However, tolerances inherent in the manufacturing process and inaccurate assembly generally result in a gap 22 being formed between the light guide plate 10 and the reflection frame 21. In operation of the plane light source, leakage of light beams takes place at the gap 22. That is, some light beams do not emit from the light emitting surface 101 but instead are lost at the gap 22. This leakage reduces the transmittance of the plane light source.

Moreover, the need for three different reflection means complicates the production process. The three reflection means are a significant expense that adds to the cost of the plane light source.

It is desired to provide a light guide plate with reflection means which overcomes the above-described problems.

SUMMARY OF THE INVENTION

An object of the present invention is to provide a light guide plate with relatively simple reflection means and high light transmission efficiency.

Another object of the present invention is to provide a relatively simple and inexpensive process for forming a light guide plate with high light transmission efficiency.

To achieve the first above-mentioned object, an exemplary light guide plate of the present invention comprises a light input surface which has a pair of light incident portions for receiving light, a bottom surface adjacent to the light input surface, a light output surface opposite to the bottom surface, and side surfaces. A reflection film is directly attached to all the surfaces of the light guide plate except the light incident portions and the light output surface.

To achieve the second above-mentioned object, an exemplary process for forming a light guide plate with reflection means comprises the following steps: providing a light guide plate, which has a pair of light incident portions for receiving light, and a light output surface for emitting light; attaching protection film to the light guide plate to cover the light incident portions and the light output surface; providing a reflection solution; dipping the light guide plate in the reflection solution; removing the light guide plate from the reflection solution, and solidifying a portion of the reflection solution remaining on the light guide plate to thereby form a reflection film; and removing the protection film to expose the light incident portions and the light output surface.

Because the reflection film is directly attached to the light guide plate, there is no gap and no attendant leakage of light. Since the reflection film is formed by a simple dipping and solidifying procedure, the relatively expensive and complicated procedures of manufacturing and adding a reflection plate and a reflection frame are avoided. In summary, the light guide plate of the present invention has a simple structure providing higher efficiency of utilization of light beams and reduced costs.

Other objects, advantages, and novel features of the present invention will become more apparent from the following detailed description when taken in conjunction with the accompanying drawings, in which:

DETAILED DESCRIPTION OF THE INVENTION

Figure 1:
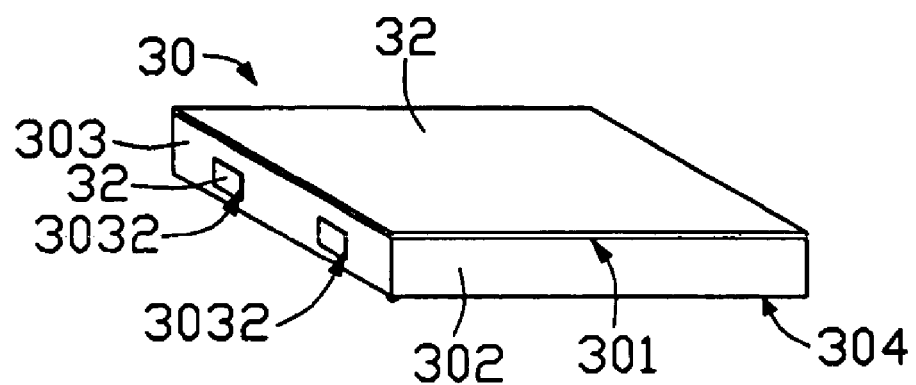
FIG. 1 is an isometric view of a light guide plate having protection film attached thereto, according to the process of the present invention.
Figure 2:
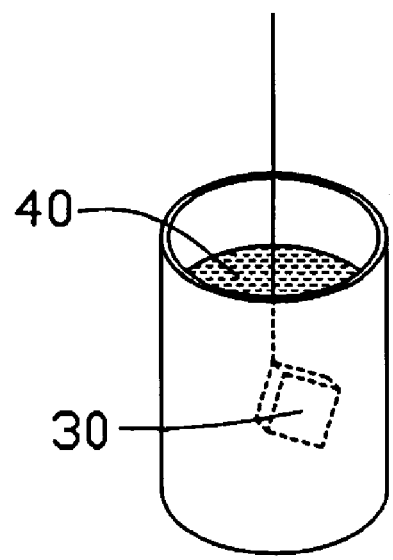
FIG. 2 is a schematic, isometric view of the light guide plate and protection film of FIG. 1 being dipped in a reflection solution, according to the process of the present invention.
Figure 3:
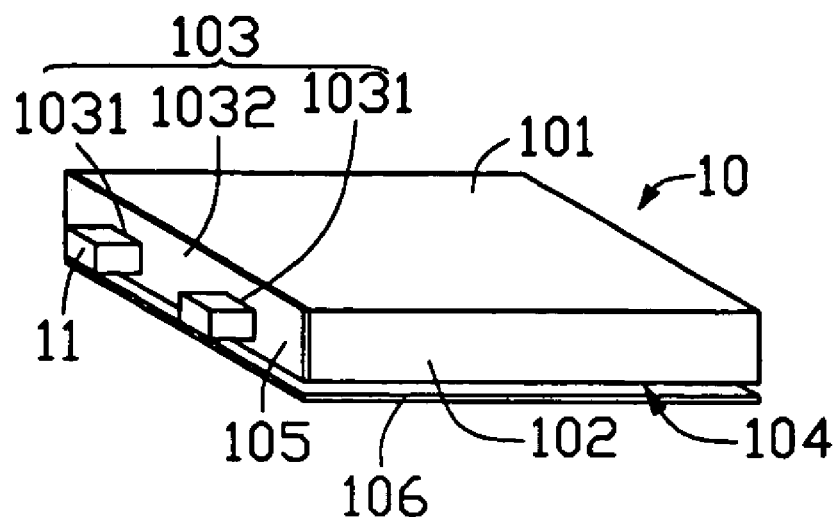
FIG. 3 is an exploded, isometric view of part of a plane light source of the prior art, the plane light source comprising a light guide plate and a bottom reflection plate and a side reflection member.
Figure 4:
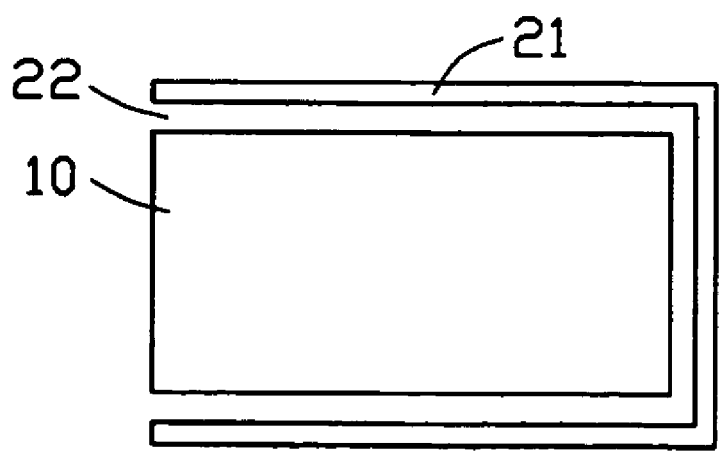
FIG. 4 is a top elevation of part of said plane light source of the prior art, showing the light guide plate of FIG. 3 surrounded on three sides by a reflection frame.

Referring to FIG. 1 and FIG. 2, a process for forming a light guide plate with a reflection film according to the present invention comprises the following steps:

(a) Providing a light guide plate 30, which comprises a light input surface 303 having a pair of light incident portions 3032, a bottom surface 304 adjacent to the light input surface 303, a light output surface 301 opposite to the bottom surface 304, and side surfaces 302. The light guide plate 30 has a rectangular cross section, and is made from acrylate by injection molding.

(b) Attaching a protection film 32 to the light guide plate 30 in order to cover the light incident portions 3032 and light output surface 301. The protection film 32 can be adhesive tape.

(c) Providing a reflection solution 40, which is made by mixing silver nitrate with ammonia.

(d) Dipping the light guide plate 30 in the reflection solution 40. The reflection solution 40 should be deep enough to submerge the light guide plate 30. Otherwise, actions such as rolling or rotating may be employed to ensure that the whole light guide plate 30 contacts the reflection solution 40.

(e) Removing the light guide plate 30 from the reflection solution 40, and solidifying a portion of the reflection solution 40 that remains on the light guide plate 30. An air-drying process may be used to solidify said portion of the reflection solution 40. After the solidifying procedure, all exposed surfaces of the light guide plate 30 are covered with a reflection film (not labeled).

(f) Removing the protection film 32 to expose the light incident portions 3032 and the light output surface 301. In this step, care must be taken so that the reflection film is not damaged.

In the aforementioned process for forming the light guide plate 30 with reflection means, a cleaning procedure may also be employed after the protection film 32 is removed. The cleaning procedure includes using a solvent such as alcohol to rinse the light guide plate 30, and wiping the light incident portions 3032 and light output surface 301 with a tissue. The cleaning procedure eliminates residual foreign particles to maximize the efficiency of light incidence and emission.

Compared to the above-described plane light source of the prior art, the light guide plate 30 employs a reflection film that is directly formed thereon. Therefore the light guide plate 30 avoids the leakage of light that the gap of the prior art plane light source causes. In addition, in manufacturing the light guide plate 30, there is no need for the relatively complicated and costly process of manufacturing and assembling three reflection means. That is, compared with the prior art, the light guide plate 30 is manufactured more easily and economically.

It is also to be generally understood that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

The invention claimed is:

1. A light guide plate, comprising:
    a light input surface which has at least one light incident portion for receiving light;
    a bottom surface adjacent to the light input surface;
    a light output surface opposite to the bottom surface, for emitting light;
    a plurality of side surfaces; and
    a reflection film;
    wherein the reflection film is formed on the bottom surface, the side surfaces, and the light input surface except said light incident portion.

2. The light guide plate as claimed in claim 1, wherein the reflection film is solidified from a reflection solution.

3. The light guide plate as claimed in claim 2, wherein the reflection solution is a mixture of silver nitrate and ammonia.

4. A process for forming a light guide plate with a reflection film, comprising:
    providing a light guide plate, which comprises a light input surface having at least one light incident portion for receiving light, and a light output surface for emitting light;
    attaching protection film on the light guide plate, the protection film covering said light incident portion and the light output surface;
    providing a reflection solution;
    dipping the light guide plate in the reflection solution;
    removing the light guide plate from the reflection solution, and solidifying a portion of the reflection solution remaining on the light guide plate; and
    removing the protection film to expose said light incident portion and the light output surface.

5. The process as claimed in claim 4, wherein the reflection solution is a mixture of silver nitrate and ammonia.

6. The process as claimed in claim 4, wherein the protection film is adhesive tape.

7. The process as claimed in claim 4, further comprising cleaning said light incident portion and the light output surface after the protection film has been removed from the light guide plate.

8. The process as claimed in claim 7, wherein said cleaning comprises rinsing the light guide plate and wiping said light incident portion and the light output surface.

9. A process for forming a light guide plate with a reflection film, comprising:
    providing a light guide plate, which comprises a light input portion and a light output portion;
    applying protection layer on the light guide plate, the protection layer covering said light input portion and light output portion;
    providing a reflection solution;
    bringing the light guide plate into contact with the reflection solution so that a portion of the reflection solution remains on at least a portion of the light guide plate that is not covered by the protection film;
    solidifying said portion of the reflection solution so that it is attached on the light guide plate; and
    removing the protection layer to expose said light input portion and said light output portion.

* * * * *